(12) United States Patent
Davies et al.

(10) Patent No.: US 8,055,579 B2
(45) Date of Patent: Nov. 8, 2011

(54) METHODS AND SYSTEMS FOR SCORE CONSISTENCY

(75) Inventors: Sarah Davies, Villanova, PA (US); Duan Wang, Huntington, NY (US); Andrada Pacheco, Danbury, CT (US)

(73) Assignee: VantageScore Solutions, LLC, Stamford, CT (US)

( * ) Notice: Subject to any disclaimer, the term of this patent is extended or adjusted under 35 U.S.C. 154(b) by 455 days.

(21) Appl. No.: 12/042,808

(22) Filed: Mar. 5, 2008

(65) Prior Publication Data

US 2009/0198611 A1    Aug. 6, 2009

Related U.S. Application Data

(60) Provisional application No. 61/026,487, filed on Feb. 6, 2008.

(51) Int. Cl.
*G06Q 40/00* (2006.01)
(52) U.S. Cl. .......................................... 705/38; 705/35
(58) Field of Classification Search .................... 705/35, 705/38
See application file for complete search history.

(56) References Cited

U.S. PATENT DOCUMENTS

| | | | | |
|---|---|---|---|---|
| 5,802,142 A | 9/1998 | Browne | ............ | 379/28 |
| 6,202,053 B1 | 3/2001 | Christiansen et al. | ........... | 705/38 |
| 6,823,319 B1 | 11/2004 | Lynch et al. | .................... | 705/38 |
| 7,003,476 B1 | 2/2006 | Samra et al. | .................... | 705/10 |
| 7,120,599 B2 | 10/2006 | Keyes | ............................. | 705/36 |
| 7,308,417 B1 | 12/2007 | Nathan | ............................ | 705/10 |
| 7,314,166 B2 | 1/2008 | Anderson et al. | .............. | 235/380 |
| 7,593,892 B2 | 9/2009 | Balk et al. | ......................... | 705/30 |
| 7,711,636 B2 | 5/2010 | Robida et al. | .................... | 705/38 |
| 7,801,812 B2 | 9/2010 | Conlin et al. | .................... | 705/38 |
| 2001/0039523 A1 | 11/2001 | Iwamoto | ......................... | 705/35 |
| 2001/0044766 A1 | 11/2001 | Keyes | ............................. | 705/36 |
| 2002/0165839 A1 | 11/2002 | Taylor et al. | .................... | 382/225 |
| 2002/0198824 A1 | 12/2002 | Cook | .............................. | 705/38 |
| 2003/0046223 A1 | 3/2003 | Crawford et al. | .............. | 705/38 |
| 2004/0030667 A1 | 2/2004 | Xu et al. | .......................... | 705/37 |
| 2004/0044617 A1 | 3/2004 | Lu | .................................. | 705/38 |
| 2004/0064402 A1 | 4/2004 | Dreyer et al. | .................... | 705/37 |
| 2004/0199456 A1 | 10/2004 | Flint et al. | ........................ | 705/35 |
| 2004/0243506 A1* | 12/2004 | Das | ................................. | 705/38 |
| 2005/0086579 A1 | 4/2005 | Leitner et al. | .................... | 705/39 |
| 2005/0102226 A1 | 5/2005 | Oppenheimer et al. | ........ | 705/38 |
| 2005/0154664 A1 | 7/2005 | Guy et al. | ......................... | 705/39 |
| 2005/0278246 A1 | 12/2005 | Friedman et al. | ................ | 705/38 |
| 2005/0279824 A1 | 12/2005 | Anderson et al. | .............. | 235/380 |
| 2006/0059073 A1* | 3/2006 | Walzak | ............................ | 705/35 |
| 2006/0129428 A1 | 6/2006 | Wennberg | ........................ | 705/20 |

(Continued)

FOREIGN PATENT DOCUMENTS

JP    2003016261    1/2003

(Continued)

OTHER PUBLICATIONS

Jones YD. (2005) Consumers Understood the Basics but Could Benefit from Targeted Educational Efforts. Finance Wire, 2005 CQTranscripts, Inc., Mar. 16, 2005 (retrieved Jun. 15, 2010).

(Continued)

*Primary Examiner* — James Kramer
*Assistant Examiner* — Hao Fu
(74) *Attorney, Agent, or Firm* — Ballard Spahr LLP

(57) ABSTRACT

Provided are methods and systems for determining score consistency.

23 Claims, 4 Drawing Sheets

U.S. PATENT DOCUMENTS

| | | | | |
|---|---|---|---|---|
| 2006/0178971 | A1 | 8/2006 | Owen et al. | 705/38 |
| 2006/0241923 | A1 | 10/2006 | Xu et al. | 703/22 |
| 2006/0242049 | A1 | 10/2006 | Haggerty et al. | 705/38 |
| 2006/0242051 | A1 | 10/2006 | Haggerty et al. | 705/38 |
| 2006/0282359 | A1 | 12/2006 | Nobili et al. | 705/38 |
| 2007/0255646 | A1* | 11/2007 | Morris et al. | 705/38 |
| 2007/0282736 | A1* | 12/2007 | Conlin et al. | 705/38 |
| 2010/0299247 | A1 | 11/2010 | Conlin et al. | 379/28 |

FOREIGN PATENT DOCUMENTS

| | | |
|---|---|---|
| TW | 256569 | 6/2002 |
| WO | WO2004/114160 | 12/2004 |
| WO | WO2006/099492 | 9/2006 |

OTHER PUBLICATIONS http://www.merriam-webster.com/dictionary/normalize (retrieved Jun. 14, 2010).

International Preliminary Report on Patentability issued Sep. 16, 2008 for PCT/US2007/063822, which was filed on Mar. 12, 2007 and published as WO 2007/106785 on Sep. 20, 2007 (Applicant—VantageScore Solutions, LLC; Inventors13 Morris et al.).

International Search Report and Written Opinion issued Sep. 11, 2007 for PCT/US2007/063822, which was filed on Mar. 12, 2007 and published as WO 2007/106785 on Sep. 20, 2007 (Applicant—VantageScore Solutions, LLC; Inventors—Morris et al.).

International Preliminary Report on Patentability issued Sep. 16, 2008 for PCT/US2007/063823, which was filed on Mar. 12, 2007 and published as WO 2007/106786 on Sep. 20, 2007 (Applicant—VantageScore Solutions, LLC; Inventors—Morris et al.).

International Search Report and Written Opinion issued Oct. 24, 2007 for PCT/US2007/063823, which was filed on Mar. 12, 2007 and published as WO 2007/106786 on Sep. 20, 2007 (Applicant—VantageScore Solutions, LLC; Inventors—Morris et al.).

International Preliminary Report on Patentability issued Sep. 16, 2008 for PCT/US2007/063824, which was filed on Mar. 12, 2007 and published as WO 2007/106787 on Sep. 20, 2007 (Applicant—VantageScore Solutions, LLC; Inventors—Torrez et al.).

International Search Report and Written Opinion issued Oct. 3, 2007 for PCT/US2007/063824, which was filed on Mar. 12, 2007 and published as WO 2007/106787 on Sep. 20, 2007 (Applicant—VantageScore Solutions, LLC; Inventors—Torrez et al.).

International Preliminary Report on Patentability issued Aug. 10, 2010 for PCT/US2008/055919, which was filed on Mar. 5, 2008 and published as WO 2009/099448 on Aug. 13, 2009 (Applicant—VantageScore Solutions, LLC; Inventors—Davies et al.).

Issue Notification issued Sep. 2, 2010 for U.S. Appl. No. 11/685,070, which was filed Mar. 12, 2007 (Inventors: Conlin et al.).

Response to Second Rule 1.312 Amendment issued Jul. 15, 2010 for U.S. Appl. No. 11/685,070, which was filed Mar. 12, 2007 (Inventors: Conlin et al.).

Second Rule 1.312 Amendment filed Jul. 9, 2010 for U.S. Appl. No. 11/685,070, which was filed Mar. 12, 2007 (Inventors: Conlin et al.).

Response to Rule 1.312 Amendment issued Jul. 8, 2010 for U.S. Appl. No. 11/685,070, which was filed Mar. 12, 2007 (Inventors: Conlin et al.).

Rule 1.312 Amendment filed Jun. 25, 2010 for U.S. Appl. No. 11/685,070, which was filed Mar. 12, 2007 (Inventors: Conlin et al.).

Notice of Allowance issued Jun. 18, 2010 for U.S. Appl. No. 11/685,070, which was filed Mar. 12, 2007 (Inventors: Conlin et al.).

Response after Non-Final Action filed Apr. 5, 2010 for U.S. Appl. No. 11/685,070, which was filed Mar. 12, 2007 (Inventors: Conlin et al.).

Interview Summary issued Feb. 23, 2010 for U.S. Appl. No. 11/685,070, which was filed Mar. 12, 2007 (Inventors: Conlin et al.).

Non-Final Rejection issued Jan. 4, 2010 for U.S. Appl. No. 11/685,070, which was filed Mar. 12, 2007 (Inventors: Conlin et al.).

Response after Final Action filed Oct. 27, 2009 for U.S. Appl. No. 11/685,070, which was filed Mar. 12, 2007 (Inventors: Conline et al.).

Final Rejection issued Jun. 5, 2009 for U.S. Appl. No. 11/685,070, which was filed Mar. 12, 2007 (Inventors: Conlin et al.).

Supplemental Response filed Mar. 26, 2009 for U.S. Appl. No. 11/685,070, which was filed Mar. 12, 2007 (Inventors: Conlin et al.).

Response after Non-Final Action filed Feb. 24, 2009 for U.S. Appl. No. 11/685,070, which was filed Mar. 12, 2007 (Inventors: Conlin et al.).

Non-Final Rejection issued Oct. 24, 2008 for U.S. Appl. No. 11/685,070, which was filed Mar. 12, 2007 (Inventors: Conlin et al.).

Preliminary Amendment file Jul. 16, 2007 for U.S. Appl. No. 11/685,070, which was filed Mar. 12, 2007 (Inventors: Conlin et al.).

Notice of Allowance issued Dec. 14, 2010 for U.S. Appl. No. 11/685,066, which was filed Mar. 12, 2007 (Inventors: Morris et al.).

Supplemental Response filed Dec. 7, 2010 for U.S. Appl. No. 11/685,066, which was filed Mar. 12, 2007 (Inventors: Morris et al.).

Response to Final Office Action filed Oct. 27, 2010 for U.S. Appl. No. 11/685,066, which was filed Mar. 12, 2007 (Inventors: Morris et al.).

Examiner Interview Summary issued Oct. 12, 2010 for U.S. Appl. No. 11/685,066, which was filed Mar. 12, 2007 (Inventors: Morris et al.).

Final Rejection issued Jun. 17, 2010 for U.S. Appl. No. 11/685,066, which was filed Mar. 12, 2007 (Inventors: Morris et al.).

Response after Non-Final Action filed Apr. 20, 2010 for U.S. Appl. No. 11/685,066, which was filed Mar. 12, 2007 (Inventors; Morris et al.).

Non-Final Rejection issued Jan. 21, 2010 for U.S. Appl. No. 11/685,066, which was filed Mar. 12, 2007 (Inventors: Morris et al.).

Response after Non-Final Action filed Oct. 27, 2009 for U.S. Appl. No. 11/685,066, which was filed Mar. 12, 2007 (Inventors: Morris et al.).

Non-Final Rejection issued May 27, 2009 for U.S. Appl. No. 11/685,066, which was filed Mar. 12, 2007 (Inventors: Morris et al.).

Response after Non-Final Action filed Feb. 24, 2009 for U.S. Appl. No. 11/685,066, which was filed Mar. 12, 2007 (Inventors: Morris et al.).

Non-Final Rejection issued Oct. 16, 2008 for U.S. Appl. No. 11/685,066, which was filed Mar. 12, 2007 (Inventors: Morris et al.).

Non-Final Office Action issued Jan. 5, 2011 for U.S. Appl. No. 11/685,061, which was filed Mar. 12, 2007 (Inventors: Morris et al.).

Response after Non-Final Office Action filed Oct. 27, 2010 for U.S. Appl. No. 11/685,061, which was filed Mar. 12, 2007 (Inventors.

Examiner Interview Summary issued Oct. 12, 2010 for U.S. Appl. No. 11/685,061, which was filed Mar. 12, 2007 (Inventors: Morris et al.).

Non-Final Office Action issued Jul. 14, 2010 for U.S. Appl. No. 11/685,061, which was filed Mar. 12, 2007 (Inventors: Morris et al.).

Response after Non-Final Action filed May 26, 2010 for U.S. Appl. No. 11/685,061, which was filed Mar. 12, 2007 (Inventors: Morris et al.).

Non-Final Rejection issued Jan. 28, 2010 for U.S. Appl. No. 11/685,061, which was filed Mar. 12, 2007 (Inventors: Morris et al.).

Response after Final Action filed Nov. 11, 2009 for U.S. Appl. No. 11/685,061, which was filed Mar. 12, 2007 (Inventors: Morris et al.)

Final Rejection issued Aug. 19, 2009 for U.S. Appl. No. 11/685,061, which was filed Mar. 12, 2007 (Inventors: Morris et al.).

Response after Non-Final Action filed Apr. 17, 2009 for U.S. Appl. No. 11/685,061, which was filed Mar. 12, 2007 (Inventors: Morris et al.).

Non-Final Rejection issued Dec. 19, 2008 for U.S. Appl. No. 11/685,061, which was filed Mar. 12, 2007 (Inventors: Morris et al.).

Supplemental Response filed Mar. 30, 2011 for U.S. Appl. No. 12/853,025, which was filed Aug. 9, 2010 (Inventors: Conlin et al.).

Response after Non-Final Action with Terminal Disclaimer filed Jan. 25, 2011 for U.S. Appl. No. 12/853,025, which was filed Aug. 9, 2010 (Inventors: Conlin et al.).

Non-Final Rejection issued Sep. 28, 2010 for U.S. Appl. No. 12/853,025, which was filed Aug. 9, 2010 (Inventors: Conlin et al.).

Preliminary Amendment filed Aug. 9, 2010 for U.S. Appl. No. 12/853,025, which was filed Aug. 9, 2010 (Inventors: Conlin et al.).

Richard Downing Jr. (1998). Changes to the Credit Reporting Act. Mortgage Banking 58(7): 82-89.

Issue Notification issued Mar. 30, 2011 for U.S. Appl. No. 11/685,066, which was filed Mar. 12, 2007 (Inventors: Morris et al.).

Notice of Allowance issued Apr. 11, 2011 for U.S. Appl. No. 12/853,025, which was filed Aug. 9, 2010 (Inventors: Conlin et al.).

International Search Report and Written Opinion issued for Application No. PCT/US2008/055919 by the International Searching Authority, Jul. 28, 2008, 9 pages.

* cited by examiner

METHODS AND SYSTEMS FOR SCORE CONSISTENCY

CROSS REFERENCE TO RELATED PATENT APPLICATIONS

This application claims priority to U.S. Provisional Application No. 61/026,487 filed Feb. 6, 2008, herein incorporated by reference in its entirety.

BACKGROUND

Typical real estate underwriting procedures require three credit scores for assessing a consumer's credit worthiness, one score from each of the three credit reporting companies (CRCs). Lenders require that these scores are not only predictive of credit risk but also are highly consistent in their absolute value. Scoring algorithms that provide inconsistent scores can increase the risk exposure that a lender takes on and offers the borrower less attractive products and pricing.

Inconsistent scores occur largely due to score algorithm differences among CRCs, timing submission and content variations in data reported by creditors. A credit score for a consumer can vary by more than 60 points between the CRCs.

Measuring score consistency is challenging for the reasons stated previously and additionally due to the fact that scores often use different ranges. Thus, for example, a consumer may score 650 using two different algorithms yet have very different risk profiles. It is possible that the former algorithm has a range of 300 to 700 where 650 indicates low risk and the latter algorithm has a range of 600 to 900 where 650 indicates high risk.

As lenders look to improve the quality of their underwriting processes, a framework is necessary for evaluating the consistency of generic risk score algorithms.

SUMMARY

In one aspect, provided are methods and systems for determining score consistency, comprising generating a first score from data obtained from a first credit reporting company for each of a plurality of entities using a first scoring algorithm, generating a second score from data obtained from a second credit reporting company for each of a plurality of entities using the first scoring algorithm, assigning each of the plurality of entities to one of a first plurality of risk groups based on the first score and one of a second plurality of risk groups based on the second score, wherein the first and second pluralities of risk groups have corresponding risk groups, determining a first score consistency value based on the number of entities in each of the corresponding risk groups in the first and second pluralities of risk groups, and outputting the first score consistency value.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
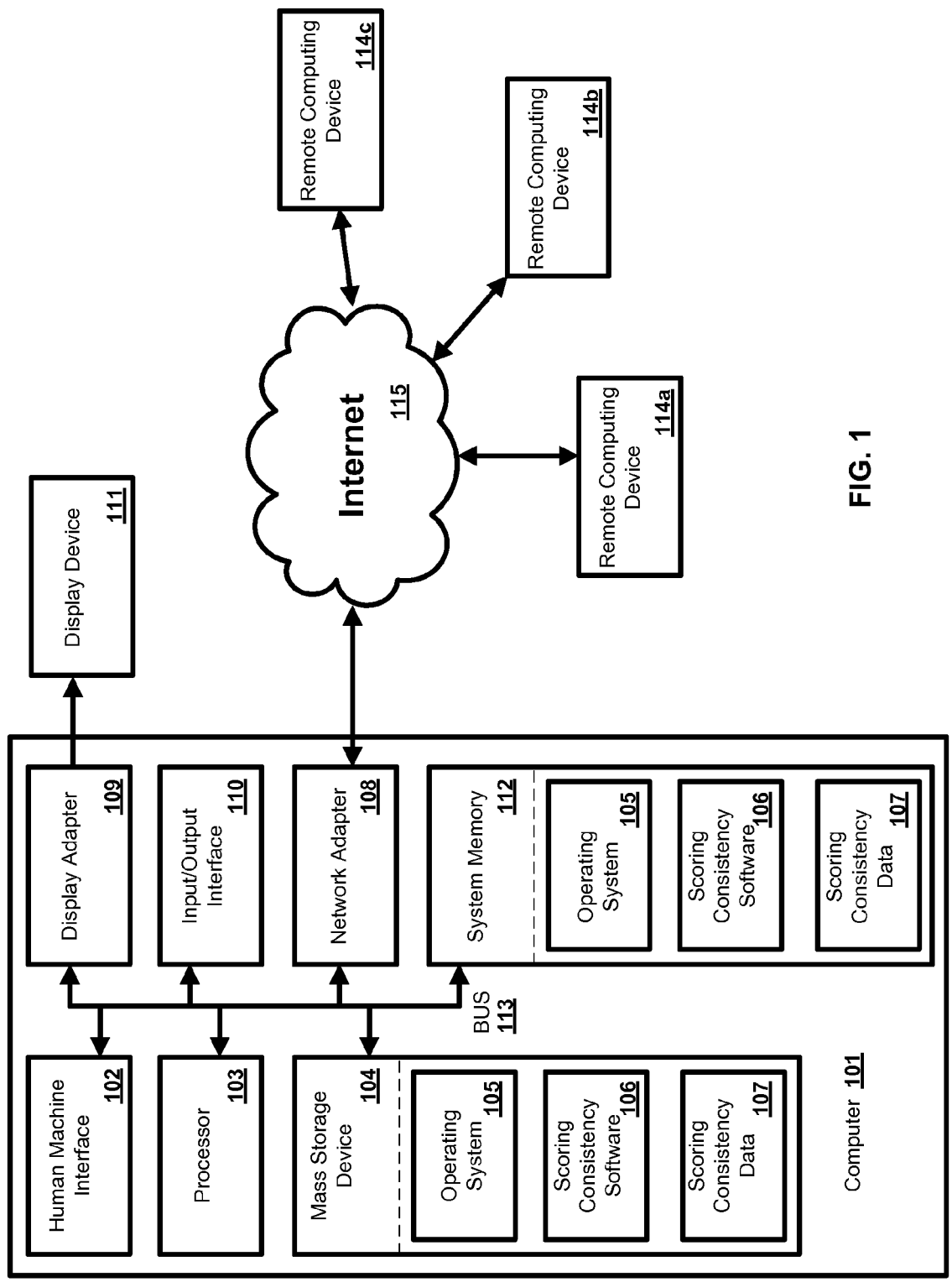
FIG. 1 is an exemplary operating environment.

Before the present methods and systems are disclosed and described, it is to be understood that the methods and systems are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Traditional generic risk scores are subject to large variations across CRCs. These variations can be driven from three sources: 1) differences in data submission by lenders and other entities; 2) differences in data classification by CRCs; and 3) differences in the score algorithms in place at each CRC. Further, different scores use different ranges to measure risk. A consistent predictive score enables lenders to implement optimal credit decision strategy, reduces confusion for the consumers when evaluating their own credit profile and helps regulators gauge lending exposure more precisely.

In one aspect, provided herein are methods and systems for measuring the consistency of a generic risk score algorithms across multiple CRCs. In one aspect, the methods and systems provided can utilize a ranking that an entity achieves based on the entity's score and its position relative to all other entity scores in a particular portfolio. An entity can be, for example, a consumer, a company, a country, a group of consumers, a group of companies, a group of countries, and the like. For example, if a consumer receives a score that ranks the consumer in the top 10% of a scored population of consumers for two different risk scoring algorithms, then for this consumer, the algorithms are highly consistent in risk assessment. Conversely, if the consumer receives a score from a first algorithm that ranks the consumer in the top 10% of the scored population according to a score range for the first algorithm and a score from a second algorithm that ranks the consumer in the bottom 10% of the scored population according to a score range for the second algorithm, then the algorithms are highly inconsistent.

I. Systems

FIG. 1 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment. One skilled in the art will appreciate that respective functions can be performed by software, hardware, or a combination of software and hardware.

The present methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the processor 103, a mass storage device 104, an operating system 105, Scoring Consistency software 106, Scoring Consistency data 107, a network adapter 108, system memory 112, an Input/Output Interface 110, a display adapter 109, a display device 111, and a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as Scoring Consistency data 107 and/or program modules such as operating system 105 and Scoring Consistency software 106 that are immediately accessible to and/or are presently operated on by the processing unit 103.

In another aspect, the computer 101 can also comprise other removable/non-removable, volatile/non-volatile computer storage media. By way of example, FIG. 1 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and Scoring Consistency software 106. Each of the operating system 105 and Scoring Consistency software 106 (or some combination thereof) can comprise elements of the programming and the Scoring Consistency software 106. Scoring Consistency data 107 can also be stored on the mass storage device 104. Scoring Consistency data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. Scoring Consistency data can comprise, for example, credit data for consumers, business, countries and the like. Scoring Consistency data can also comprise, for example, scores determined using a variety of scoring algorithms using credit data.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110.

The computer 101 can operate in a networked environment using logical connections to one or more remote computing devices 114a,b,c. By way of example, a remote computing device can be a personal computer, portable computer, a server, a router, a network computer, a peer device or other common network node, and so on. Logical connections between the computer 101 and a remote computing device 114a,b,c can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 115.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of Scoring Consistency software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

II. Methods

Figure 2:
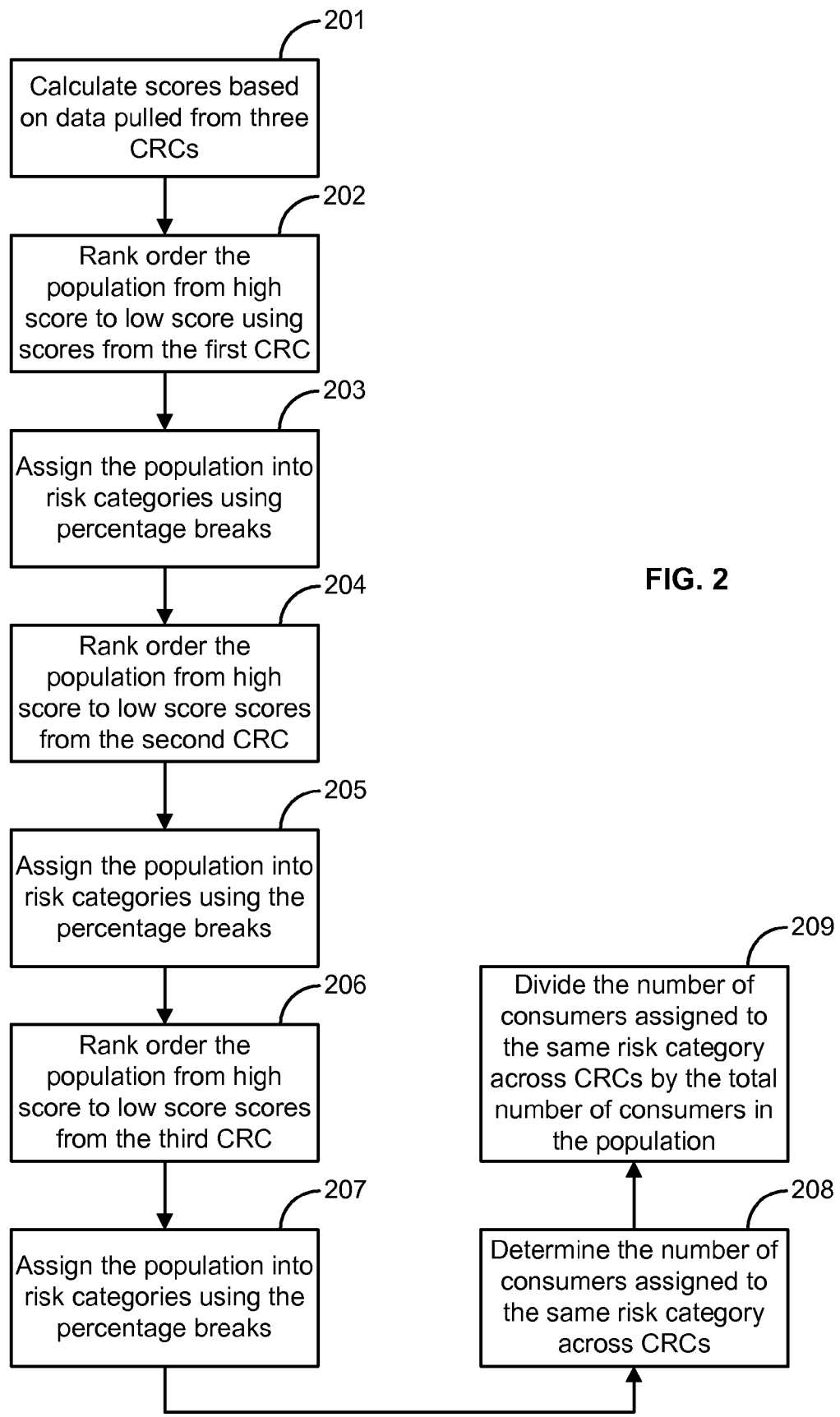
FIG. 2 is an exemplary method for determining score consistency.

In one aspect, illustrated in FIG. 2, provided is a method for determining score consistency. By way of example, the method is described in the context of three CRCs. However, it is contemplated that the methods described herein can be used with less than three CRCs and more than three CRCs. Let GR_Score be any generic risk score which is available from all three CRCs. Let GR_Score_CRC1 denote the GR_Score calculated and pulled from CRC1, GR_Score_CRC2 denote the GR_Score calculated and pulled from CRC2, and GR_Score_CRC3 denote the GR_Score calculated and pulled from CRC3.

Score a random sample of consumers with the condition that GR_Scores are available for each and every record in the sample from all three CRCs at 201. Rank order the population from high score to low score using GR_Score_CRC1 at 202. Assign the population into risk categories using percentage breaks using GR_Score_CRC1 at 203. For example, assign the top scored $X_1\%$ of the population into a category labeled "Low Risk", put the next $X_2\%$ of population into category "Medium Risk", and the next $X_3\%$ of population into category "High Risk", and the rest $X_4\%$ (the lowest scored) population into category "Very High Risk", as shown in the table below.

| Population Groups | Label | Population Breaks |
|---|---|---|
| Low Risk | L | $X_1\%$ |
| Medium Risk | M | $X_2\%$ |
| High Risk | H | $X_3\%$ |
| Very High Risk | V | $X_4\%$ |
| Total | | $X_1\% + X_2\% + X_3\% + X_4\% = 100\%$ |

Similarly, rank order the same population using GR_Score_CRC2 at 204, and assign them into the same risk categories using the same percentage breaks (i.e. $X_1\%$, $X_2\%$, $X_3\%$, $X_4\%$) at 205. Rank order the same population using GR_Score_CRC3 at 206, and assign them into the same risk categories using the same percentage breaks (i.e. $X_1\%$, $X_2\%$, $X_3\%$, $X_4\%$) at 207.

Determine the number of consumers assigned to the same risk category across CRCs at 208. For example, determine the number of consumers who are categorized as 'Low Risk' in CRC 1 and also categorized 'Low Risk' in CRC 2 and 'Low Risk' in CRC 3. Similarly perform the same determination for the Medium Risk, High Risk and Very High Risk groups.

Divide the number of consumers assigned to the same risk category across CRCs by the total number of consumers in the population at 209, resulting in a score consistency value, also referred to as the score consistency index (SCI hereafter). The SCI can be determined as follows:

$$\text{SCI(Score Consistency Index)} = (N_1 + N_2 + N_3 + N_4)/N$$

wherein N is the total number of consumers in the sample; $N_1$ is the number of consumers who are categorized into "Low Risk" in all three CRCs; $N_2$ is the number of consumers who are categorized into "Medium Risk" in all three CRCs; $N_3$ is the number of consumers who are categorized into "High Risk" in all three CRCs; and $N_4$ is the number of consumers who are categorized into "Very High Risk" in all three CRCs.

Figure 3:
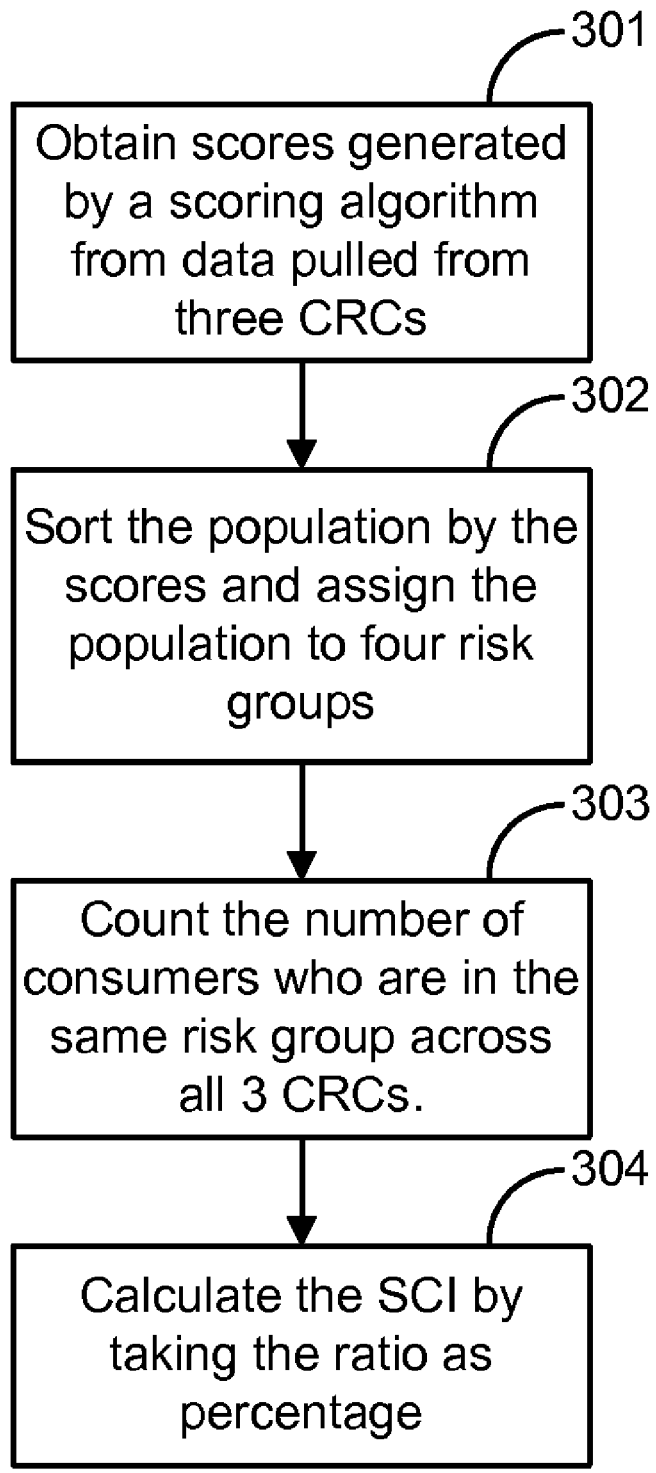
FIG. 3 is another embodiment of an exemplary method for determining score consistency.

In another aspect, illustrated in FIG. 3, provided is an exemplary determination of SCI using 20 consumers (N=20), with the population broken into four equal sized risk groups (so $X_1\%=X_2\%=X_3\%=X_4\%=25\%$). However, risk groups do not have to be of equal size. SCI will be determined for a hypothesized generic risk score, referred to herein as GR, which is available from each of the 3 CRCs, with a hypothetical score range of 1 to 1000. For each consumer, the GR score from CRC 1 is denoted by GR_CRC1, from CRC 2 denoted by GR_CRC2, and so on. All score values are arbitrary and for illustration purpose only.

| Consumers | GR_CRC1 | GR_CRC2 | GR_CRC3 |
|---|---|---|---|
| Consumer 1 | 739 | 750 | 630 |
| Consumer 2 | 890 | 981 | 730 |
| Consumer 3 | 150 | 366 | 233 |
| Consumer 4 | 460 | 761 | 638 |
| Consumer 5 | 890 | 996 | 988 |
| Consumer 6 | 874 | 379 | 569 |
| Consumer 7 | 762 | 475 | 485 |
| Consumer 8 | 569 | 345 | 651 |
| Consumer 9 | 68 | 98 | 123 |
| Consumer 10 | 256 | 569 | 432 |
| Consumer 11 | 334 | 442 | 365 |
| Consumer 12 | 786 | 835 | 998 |
| Consumer 13 | 589 | 489 | 543 |
| Consumer 14 | 489 | 478 | 467 |
| Consumer 15 | 109 | 308 | 508 |
| Consumer 16 | 982 | 820 | 880 |
| Consumer 17 | 590 | 585 | 620 |
| Consumer 18 | 680 | 589 | 591 |
| Consumer 19 | 368 | 490 | 461 |
| Consumer 20 | 678 | 873 | 690 |

Obtain scores based on generated by a scoring algorithm from data pulled from three CRCs at 301. Sort the population by GR_CRC1, GR_CRC2, GR_CRC3, respectively, and assign them to four risk groups at 302 (i.e. 25% of the population per risk group), the results are shown by the following table:

| 25% For Each Risk Group | Sorted by GR_CRC1 | | Sorted by GR_CRC2 | | Sorted by GR_CRC3 | |
|---|---|---|---|---|---|---|
| Low Risk | | | | | | |
| Consumer 16 | 982 | Consumer 5 | 996 | Consumer 12 | 998 | |
| Consumer 2 | 890 | Consumer 2 | 981 | Consumer 5 | 988 | |
| Consumer 5 | 890 | Consumer 20 | 873 | Consumer 16 | 880 | |
| Consumer 6 | 874 | Consumer 12 | 835 | Consumer 2 | 730 | |
| Consumer 12 | 786 | Consumer 16 | 820 | Consumer 20 | 690 | |
| Medium Risk | | | | | | |
| Consumer 7 | 762 | Consumer 4 | 761 | Consumer 8 | 651 | |
| Consumer 1 | 739 | Consumer 1 | 750 | Consumer 4 | 638 | |
| Consumer 18 | 680 | Consumer 18 | 589 | Consumer 1 | 630 | |
| Consumer 20 | 678 | Consumer 17 | 585 | Consumer 17 | 620 | |
| Consumer 17 | 590 | Consumer 10 | 569 | Consumer 18 | 591 | |
| High Risk | | | | | | |
| Consumer 13 | 589 | Consumer 19 | 490 | Consumer 6 | 569 | |
| Consumer 8 | 569 | Consumer 13 | 489 | Consumer 13 | 543 | |
| Consumer 14 | 489 | Consumer 14 | 478 | Consumer 15 | 508 | |
| Consumer 4 | 460 | Consumer 7 | 475 | Consumer 7 | 485 | |
| Consumer 19 | 368 | Consumer 11 | 442 | Consumer 14 | 467 | |
| Very High Risk | | | | | | |
| Consumer 11 | 334 | Consumer 6 | 379 | Consumer 19 | 461 | |
| Consumer 10 | 256 | Consumer 3 | 366 | Consumer 10 | 432 | |
| Consumer 3 | 150 | Consumer 8 | 345 | Consumer 11 | 365 | |
| Consumer 15 | 109 | Consumer 15 | 308 | Consumer 3 | 233 | |
| Consumer 9 | 68 | Consumer 9 | 98 | Consumer 9 | 123 | |

Count the number of consumers who are in the same risk group across all 3 CRCs at 303. For Low Risk, consumers numbered 2, 5, 12, 16 are in the low risk group for all 3 CRCs, so $N_1=4$; for Medium Risk, consumers numbered 1, 17, 18 are in the medium risk group for all 3 CRCs, so $N_2=3$; for High Risk, consumers numbered 13, 14 are in the high risk group for all 3 CRCs, so $N_3=2$; for Very High Risk, consumers numbered 3, 9 are in the very high risk group for all 3 CRCs, so $N_4=2$. Then calculate the SCI by taking the ratio as percentage at 304: $SCI=(N_1+N_2+N_3+N_4)/N=(4+3+2+2)/20=11/20=55\%$. SCI Interpretation: 55% of the population are consistently ranked in the same risk tier across the three CRCs.

The methods and systems provided enable lenders to quantitatively compare consistency performance of score algorithms and to factor this information in their overall assessment of the score algorithm's accuracy. The methods and systems provided herein provide several valuable business frameworks for the lending industry. For example, product assignment consistency. Utilizing a simple '4 primary tier' framework, a score can be evaluated for its ability to consistently place a consumer in the appropriate product range given their credit risk profile. Tiers can be defined such that they reflect super prime, prime, near and sub-prime behavior. For example, the super-prime tier could be defined as the top 15% of the population, prime as the next 50%, near-prime as the next 15%, and sub-prime as the final 10%. Another valuable business framework provided by the methods and systems is pricing assignment consistency. A secondary framework can be deployed within any of the above primary tiers to further evaluate the scores' ability to consistently rank the consumer within a specific risk tier (e.g. high, medium, low risk) such that the appropriate pricing can be assigned. The secondary framework is essentially nested within the primary tier.

A framework design using four risk categories logically aligns with business lending strategy, since the majority of lenders categorize their portfolio or prospects into four risk groups and formalize business strategies around that framework. Commonly-used terminology for the four tiers is Super-Prime, Prime, Near-Prime, and Sub-Prime. The absolute definition of these risk groups (in terms of score cuts or population percentage breaks) varies for different lenders, and for different products. For example, the definition of Sub-Prime for a mortgage lender may be quite different from that of a credit card lender. Therefore, it is useful to vary the population percentage breaks for the four tiers to understand the stability of the index. The methods and systems described herein can utilize any number of risk groups and variations of percentage breaks.

Figure 4:
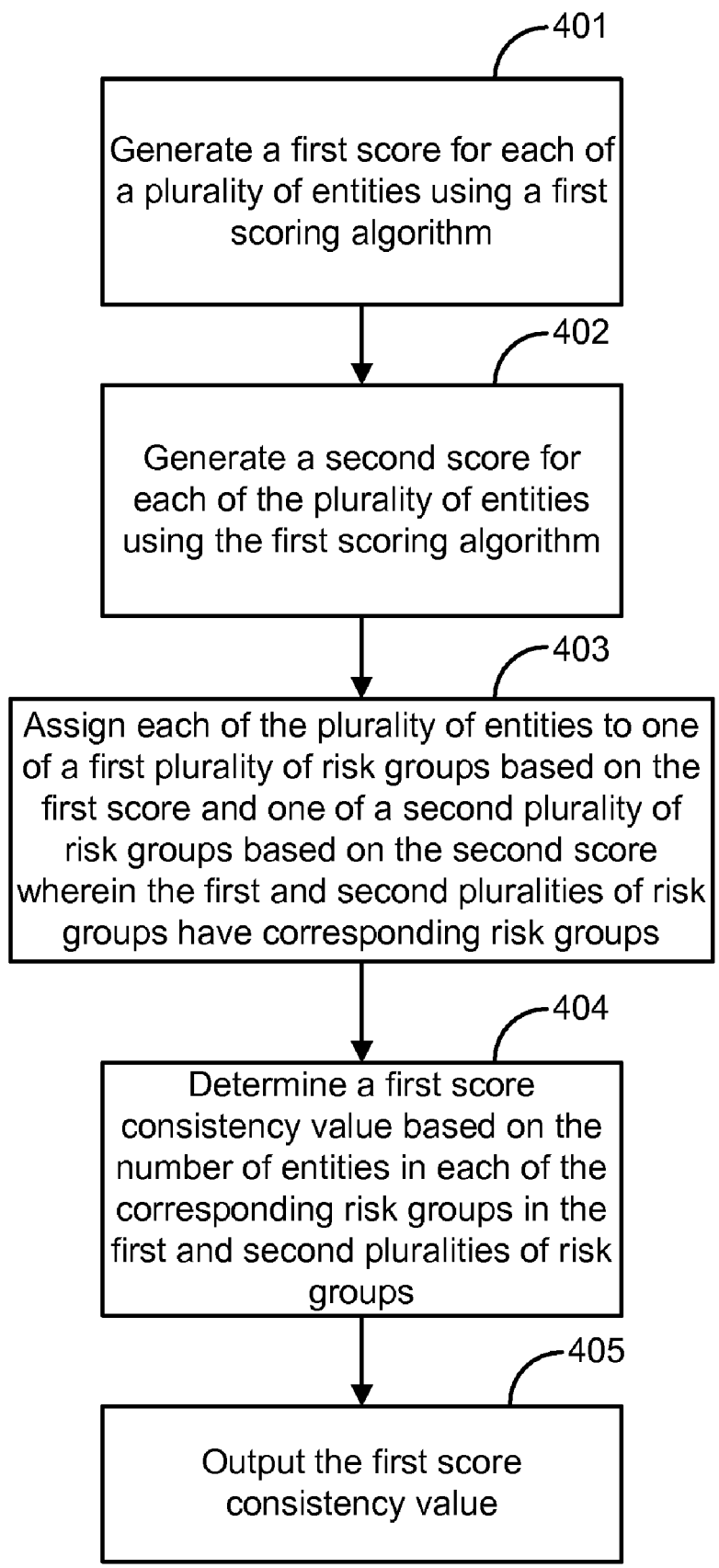
FIG. 4 is another embodiment of an exemplary method for determining score consistency.

In another aspect, illustrated in FIG. 4, provided are methods for determining score consistency, comprising generating a first score for each of a plurality of entities using a first scoring algorithm at 401, generating a second score for each of the plurality of entities using the first scoring algorithm at 402, assigning each of the plurality of entities to one of a first plurality of risk groups based on the first score and one of a second plurality of risk groups based on the second score wherein the first and second pluralities of risk groups have corresponding risk groups at 403, determining a first score consistency value based on the number of entities in each of the corresponding risk groups in the first and second pluralities of risk groups at 404, and outputting the first score consistency value at 405. The plurality of entities can be, for example, a plurality of consumers, companies, countries, and the like. Risk groups can be, for example, super prime, prime, near and sub-prime. The super-prime group can be defined as the top 15% of the population, prime as the next 50%, near-prime as the next 15%, and sub-prime as the final 10%. In other aspects, risk groups can be preferred and non-preferred. The preferred group can be defined as the top 25% of the population and the non-preferred as the remaining 75%. The number of risk groups and the definitions of risk groups can, and will, vary depending on the application.

In an aspect, the first score and the second score can be obtained from a first credit reporting company. In another aspect, the first score can be obtained from a first credit reporting company and the second score can be obtained from a second credit reporting company. In an aspect, the methods are operative on more than two scores, more than two credit reporting companies, and/or more than two scoring algorithms.

The methods can further comprise repeating 401-405 using a second scoring algorithm to generate a second scoring consistency value. The methods can further comprise comparing the first and second scoring consistency values to determine which scoring algorithm provides more consistent scores.

Assigning each of the plurality of entities to one of a first plurality of risk groups based on the first score and one of a second plurality of risk groups based on the second score wherein the first and second pluralities of risk groups have corresponding risk groups can comprise ranking the plurality of entities by first score, resulting in a first ranked list, ranking the plurality of entities by second score, resulting in a second ranked list, dividing the first ranked list into a first portion and a second portion, wherein the first portion represents a first risk group and the second portion represents a second risk group of the first plurality of risk groups, and dividing the second ranked list into a first portion and a second portion, wherein the first portion represents the first risk group and the second portion represents the second risk group of the second plurality of risk groups.

Determining a first score consistency value based on the number of entities in each of the corresponding risk groups in the first and second pluralities of risk groups can comprise determining the total number of entities assigned to corresponding risk groups in the first and second pluralities of risk groups and dividing the total number of entities assigned to corresponding risk groups in the first and second pluralities of risk groups by the number of the plurality of entities, resulting in the first score consistency value.

Determining the total number of entities assigned to corresponding risk groups in the first and second pluralities of risk groups can comprise identifying entities located in both the first portion of the first ranked list and the first portion of the second ranked list and identifying entities located in both the second portion of the first ranked list and the second portion of the second ranked list.

Outputting the first score consistency value can comprise displaying the first score consistency value on a display device.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A computer-implemented method for determining score consistency, comprising:
   a. generating by a computer a first score for each of a plurality of entities using a first scoring algorithm, wherein the first score is predictive of credit risk;
   b. generating by a computer a second score for each of the plurality of entities using the same or a different scoring algorithm, wherein the second score is predictive of credit risk;
   c. ranking by a computer the plurality of entities by the first score, resulting in a first ranked list;
   d. ranking by a computer the plurality of entities by the second score, resulting in a second ranked list;

e. assigning, based on the first ranked list, each of the plurality of entities to one of a first plurality of risk groups;
f. assigning, based on the second ranked list, each of the plurality of entities to one of a second plurality of risk groups, wherein the second plurality of risk groups corresponds to the first plurality of risk groups;
g. determining by a computer, in each of the corresponding risk groups, a number of entities assigned to the same corresponding risk group across the first and second ranked lists;
h. determining by a computer a total number of entities assigned to the same corresponding risk groups across the first and second ranked lists by adding the numbers determined in step g;
i. dividing the total number of entities assigned to the same corresponding risk groups across the first and second ranked lists by the number of the plurality of entities, resulting in a first score consistency value; and
j. outputting the first score consistency value.

2. The method of claim 1, wherein the plurality of entities is a plurality of consumers.

3. The method of claim 1, wherein each of the assigning steps further comprises:
dividing by a computer the first ranked list into a first portion and a second portion, wherein the first portion represents a first risk group and the second portion represents a second risk group of the first plurality of risk groups; and
dividing by a computer the second ranked list into a first portion and a second portion, wherein the first portion represents the first risk group and the second portion represents the second risk group of the second plurality of risk groups.

4. The method of claim 3, further comprising:
identifying by a computer entities located in both the first portion of the first ranked list and the first portion of the second ranked list; and
identifying by a computer entities located in both the second portion of the first ranked list and the second portion of the second ranked list.

5. The method of claim 1, wherein the outputting step comprises displaying the first score consistency value on a display device.

6. The method of claim 1, further comprising repeating by a computer steps a-j using one or more scoring algorithms to generate a second scoring consistency value.

7. The method of claim 6, further comprising, comparing by a computer the first and second scoring consistency values to determine which scoring algorithm provides more consistent scores.

8. The method of claim 1, wherein the first score and the second score are obtained from a first credit reporting company.

9. The method of claim 1, wherein the first score is obtained from a first credit reporting company and the second score is obtained from a second credit reporting company.

10. A computer-implemented method for determining score consistency, comprising:
a. generating by a computer a first score for each of a plurality of entities using a first scoring algorithm, wherein the first score is predictive of credit risk;
b. generating by a computer a second score for each of the plurality of entities using a second scoring algorithm, wherein the second score is predictive of credit risk;
c. ranking by a computer the plurality of entities by the first score, resulting in a first ranked list;
d. ranking by a computer the plurality of entities by the second score, resulting in a second ranked list;
e. assigning, based on the first ranked list, each of the plurality of entities to one of a first plurality of risk groups;
f. assigning, based on the second ranked list, each of the plurality of entities to one of a second plurality of risk groups, wherein the second plurality of risk groups corresponds to the first plurality of risk groups;
g. determining by a computer, in each of the corresponding risk groups, a number of entities assigned to the same corresponding risk group across the first and second ranked lists;
h. determining by a computer a total number of entities assigned to the same corresponding risk groups across the first and second ranked lists by adding the numbers determined in step g;
i. dividing the total number of entities assigned to the same corresponding risk groups across the first and second ranked lists by the number of the plurality of entities, resulting in a score consistency value; and
j. outputting by a computer the score consistency value.

11. The method of claim 10, wherein the plurality of entities is a plurality of consumers.

12. The method of claim 10, wherein each of the assigning steps further comprises:
dividing by a computer the first ranked list into a first portion and a second portion, wherein the first portion represents a first risk group and the second portion represents a second risk group of the first plurality of risk groups; and
dividing by a computer the second ranked list into a first portion and a second portion, wherein the first portion represents the first risk group and the second portion represents the second risk group of the second plurality of risk groups.

13. The method of claim 12, further comprising:
identifying by a computer entities located in both the first portion of the first ranked list and the first portion of the second ranked list; and
identifying by a computer entities located in both the second portion of the first ranked list and the second portion of the second ranked list.

14. The method of claim 10, wherein the outputting step comprises displaying the score consistency value on a display device.

15. The method of claim 10, wherein the first score and the second score are obtained from a first credit reporting company.

16. The method of claim 10, wherein the first score is obtained from a first credit reporting company and the second score is obtained from a second credit reporting company.

17. A system for determining score consistency, comprising:
a memory configured to store scoring consistency data; and
a processor, configured to perform steps comprising
a. generating a first score for each of a plurality of entities using a first scoring algorithm, wherein the first score is predictive of credit risk;
b. generating a second score for each of the plurality of entities using the same or a different scoring algorithm, wherein the second score is predictive of credit risk;
c. ranking the plurality of entities by the first score, resulting in a first ranked list;
d. ranking the plurality of entities by the second score, resulting in a second ranked list;

e. assigning, based on the first ranked list, each of the plurality of entities to one of a first plurality of risk groups;

f. assigning, based on the second ranked list, each of the plurality of entities to one of a second plurality of risk groups, wherein the second plurality of risk groups corresponds to the first plurality of risk groups;

g. determining, in each of the corresponding risk groups, a number of entities assigned to the same corresponding risk group across the first and second ranked lists;

h. determining a total number of entities assigned to the same corresponding risk groups across the first and second ranked lists by adding the numbers determined in step g;

i. dividing the total number of entities assigned to the same corresponding risk groups across the first and second ranked lists by the number of the plurality of entities, resulting in a first score consistency value; and j. outputting the first score consistency value.

18. The system of claim 17, further comprising repeating steps a-j using one or more scoring algorithm to generate a second scoring consistency value.

19. A non-transitory computer readable medium having computer executable instructions embodied thereon for determining score consistency, the instructions comprising:

a. generating a first score for each of a plurality of entities using a first scoring algorithm, wherein the first score is predictive of credit risk;

b. generating a second score for each of the plurality of entities using the same or a different scoring algorithm, wherein the second score is predictive of credit risk;

c. ranking the plurality of entities by the first score, resulting in a first ranked list;

d. ranking the plurality of entities by the second score, resulting in a second ranked list;

e. assigning, based on the first ranked list, each of the plurality of entities to one of a first plurality of risk groups;

f. assigning, based on the second ranked list, each of the plurality of entities to one of a second plurality of risk groups, wherein the second plurality of risk groups corresponds to the first plurality of risk groups;

g. determining, in each of the corresponding risk groups, a number of entities assigned to the same corresponding risk group across the first and second ranked lists;

h. determining a total number of entities assigned to the same corresponding risk groups across the first and second ranked lists by adding the numbers determined in step g;

i. dividing the total number of entities assigned to the same corresponding risk groups across the first and second ranked lists by the number of the plurality of entities, resulting in a first score consistency value; and j. outputting the first score consistency value.

20. A computer-implemented method for determining score consistency, comprising:

a. generating by a computer a first score for each of a plurality of entities using a first scoring algorithm, wherein the first score is predictive of credit risk;

b. generating by a computer a second score for each of the plurality of entities using the same or a different scoring algorithm, wherein the second score is predictive of credit risk;

c. generating by a computer a third score for each of the plurality of entities using the same or a different scoring algorithm, wherein the third score is predictive of credit risk;

d. ranking by a computer the plurality of entities by the first score, resulting in a first ranked list;

e. ranking by a computer the plurality of entities by the second score, resulting in a second ranked list;

f. ranking by a computer the plurality of entities by the third score, resulting in a third ranked list;

g. assigning, based on the first ranked list, each of the plurality of entities to one of a first plurality of risk groups;

h. assigning, based on the second ranked list, each of the plurality of entities to one of a second plurality of risk groups, wherein the second plurality of risk groups corresponds to the first plurality of risk groups;

i. assigning, based on the third ranked list, each of the plurality of entities to one of a third plurality of risk groups, wherein the third plurality of risk groups corresponds to the first and second pluralities of risk groups;

j. determining by a computer, in each of the corresponding risk groups, a number of entities assigned to the same corresponding risk group across the first, second, and third ranked lists;

k. determining by a computer a total number of entities assigned to the same corresponding risk groups across the first, second, and third ranked lists by adding the numbers determined in step j;

l. dividing the total number of entities assigned to the same corresponding risk groups across the first, second, and third ranked lists by the number of the plurality of entities, resulting in a first score consistency value; and m. outputting by a computer the first score consistency value.

21. A computer-implemented method for determining score consistency, comprising:

a. generating by a computer a first score for each of a plurality of entities using a first scoring algorithm, wherein the first score reflects credit worthiness;

b. generating by a computer a second score for each of the plurality of entities using a second scoring algorithm, wherein the second score reflects credit worthiness;

c. generating by a computer a third score for each of the plurality of entities using a third scoring algorithm, wherein the third score reflects credit worthiness;

d. ranking by a computer the plurality of entities by the first score, resulting in a first ranked list;

e. ranking by a computer the plurality of entities by the second score, resulting in a second ranked list;

f. ranking by a computer the plurality of entities by the third score, resulting in a third ranked list;

g. assigning, based on the first ranked list, each of the plurality of entities to one of a first plurality of risk groups;

h. assigning, based on the second ranked list, each of the plurality of entities to one of a second plurality of risk groups, wherein the second plurality of risk groups corresponds to the first plurality of risk groups;

i. assigning, based on the third ranked list, each of the plurality of entities to one of a third plurality of risk groups, wherein the third plurality of risk groups corresponds to the first and second pluralities of risk groups;

j. determining by a computer, in each of the corresponding risk groups, a number of entities assigned to the same corresponding risk group across the first, second, and third ranked lists;

k. determining by a computer a total number of entities assigned to the same corresponding risk groups across the first, second, and third ranked lists by adding the numbers determined in step j;
l. dividing the total number of entities assigned to the same corresponding risk groups across the first, second, and third ranked lists by the number of the plurality of entities, resulting in a score consistency value; and
m. outputting by a computer the score consistency value.

22. A system for determining score consistency, comprising:
a memory configured to store scoring consistency data; and
a processor, configured to perform steps comprising
   a. generating a first score for each of a plurality of entities using a first scoring algorithm, wherein the first score is predictive of credit risk;
   b. generating a second score for each of the plurality of entities using the same or a different scoring algorithm, wherein the second score is predictive of credit risk;
   c. generating a third score for each of the plurality of entities using the same or a different scoring algorithm, wherein the third score is predictive of credit risk;
   d. ranking the plurality of entities by the first score, resulting in a first ranked list;
   e. ranking the plurality of entities by the second score, resulting in a second ranked list;
   f. ranking the plurality of entities by the third score, resulting in a third ranked list;
   g. assigning, based on the first ranked list, each of the plurality of entities to one of a first plurality of risk groups;
   h. assigning, based on the second ranked list, each of the plurality of entities to one of a second plurality of risk groups, wherein the second plurality of risk groups corresponds to the first plurality of risk groups;
   i. assigning, based on the third ranked list, each of the plurality of entities to one of a third plurality of risk groups, wherein the third plurality of risk groups corresponds to the first and second pluralities of risk groups;
   j. determining, in each of the corresponding risk groups, a number of entities assigned to the same corresponding risk group across the first, second, and third ranked lists;
   k. determining a total number of entities assigned to the same corresponding risk groups across the first, second, and third ranked lists by adding the numbers determined in step j;
   l. dividing the total number of entities assigned to the same corresponding risk groups across the first, second, and third ranked lists by the number of the plurality of entities, resulting in a first score consistency value; and
   m. outputting the first score consistency value.

23. A non-transitory computer readable medium having computer executable instructions embodied thereon for determining score consistency, the instructions comprising:
   a. generating a first score for each of a plurality of entities using a first scoring algorithm, wherein the first score is predictive of credit risk;
   b. generating a second score for each of the plurality of entities using the same or a different scoring algorithm, wherein the second score is predictive of credit risk;
   c. generating a third score for each of the plurality of entities using the same or a different scoring algorithm, wherein the third score is predictive of credit risk;
   d. ranking the plurality of entities by the first score, resulting in a first ranked list;
   e. ranking the plurality of entities by the second score, resulting in a second ranked list;
   f. ranking the plurality of entities by the third score, resulting in a third ranked list;
   g. assigning, based on the first ranked list, each of the plurality of entities to one of a first plurality of risk groups;
   h. assigning, based on the second ranked list, each of the plurality of entities to one of a second plurality of risk groups, wherein the second plurality of risk groups corresponds to the first plurality of risk groups;
   i. assigning, based on the third ranked list, each of the plurality of entities to one of a third plurality of risk groups, wherein the third plurality of risk groups corresponds to the first and second pluralities of risk groups;
   j. determining, in each of the corresponding risk groups, a number of entities assigned to the same corresponding risk group across the first, second, and third ranked lists;
   k. determining a total number of entities assigned to the same corresponding risk groups across the first, second, and third ranked lists by adding the numbers determined in step j;
   l. dividing the total number of entities assigned to the same corresponding risk groups across the first, second, and third ranked lists by the number of the plurality of entities, resulting in a first score consistency value; and
   m. outputting the first score consistency value.

* * * * *